United States Patent [19]

Diehl

[11] 4,046,184
[45] Sept. 6, 1977

[54] SAFETY MEANS FOR PREVENTING DEMOUNTING OF LOW OR FLAT TIRES FROM VEHICLE WHEELS

[76] Inventor: John A. Diehl, Apt. No. 305 S, 2111 Jefferson-Davis, Arlington, Va. 22202

[21] Appl. No.: 591,077

[22] Filed: June 27, 1975

Related U.S. Application Data

[63] Continuation-in-part of Ser. No. 494,163, Aug. 2, 1974, abandoned.

[51] Int. Cl.² ............................................. B60B 25/06
[52] U.S. Cl. ................................. 152/407; 301/35 SS
[58] Field of Search ............ 301/11, 5 R, 9 R, 10 R, 301/11 R, 12 R, 15, 23, 24, 35 R, 35 SL, 35 SS, 95–99; 152/375, 378, 381, 385, 386, 396, 397, 405–410

[56] References Cited

U.S. PATENT DOCUMENTS

| 894,293 | 7/1908 | Shaw | 152/406 |
|---|---|---|---|
| 1,058,400 | 4/1913 | Ashley et al. | 152/407 X |
| 1,317,860 | 10/1919 | Butcher | 152/408 X |
| 1,403,777 | 1/1922 | Hegar | 152/406 |
| 1,434,222 | 10/1922 | Perlman | 152/407 |
| 1,486,174 | 3/1924 | Williams | 152/408 X |
| 1,739,877 | 12/1929 | Walenhorst | 152/405 |
| 1,989,188 | 1/1935 | Frank | 152/407 |
| 3,529,869 | 9/1970 | Casey | 301/11 |
| 3,608,607 | 9/1969 | Gerbeth | 152/410 |
| 3,759,307 | 9/1973 | Walther et al. | 152/396 |

FOREIGN PATENT DOCUMENTS

| 2,254,721 | 5/1973 | Germany | 301/97 |
|---|---|---|---|
| 1,388,699 | 3/1975 | United Kingdom | 301/97 |

*Primary Examiner*—Robert B. Reeves
*Assistant Examiner*—Charles A. Marmor
*Attorney, Agent, or Firm*—Littlepage, Quaintance, Murphy, Richardson & Webner

[57] ABSTRACT

A relatively simple and highly efficient safety system for retaining the tires, which are mounted on the front wheels of heavy, over-the-road vehicle such as trucks, buses and the like, in the event of gradual or sudden deflation of the tires. Such tires are locked onto rims of the two or three-piece types, mounted on disc or spoked wheels. The important and essential features of the present invention reside in the provision of a radially-extending locking lug detachably mounted on and rigidly secured to a spoke of the wheel or in the ventilating holes in disc wheels and which terminates at its outer end in a position to contact the outer flange of a two-piece rim installation, or in the case of a three-piece rim installation, to contact the outer flange and to overlie the radially-split locking ring. Thus the tire and flange are prevented from becoming detached from the rim in two-piece rim constructions, and the flange, tire and locking ring are prevented from becoming detached from the rim upon deflation of the tires mounted on three piece rims. An embodiment of the present invention also prevents circumferential movement of the rim constructions and the tires mounted thereon.

1 Claim, 16 Drawing Figures

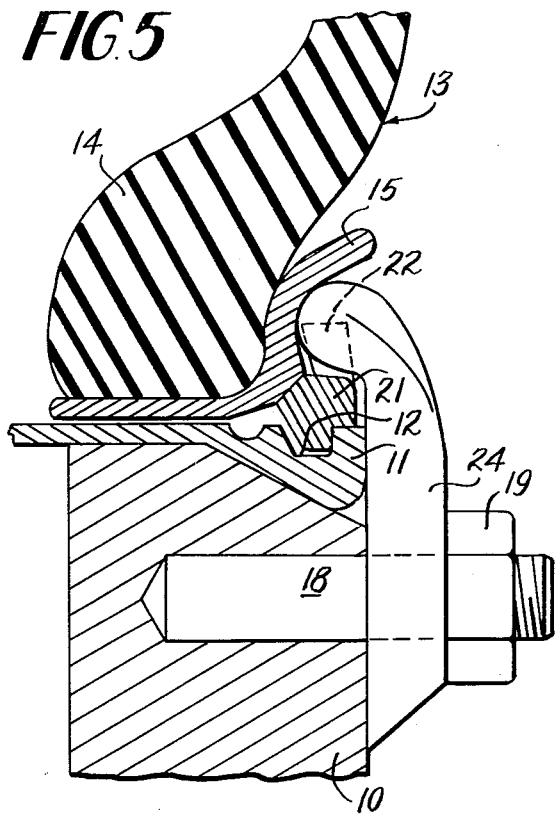
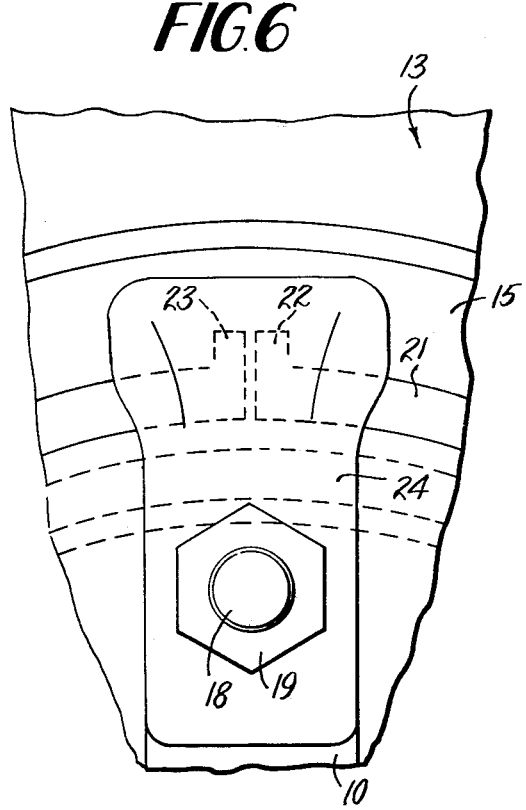
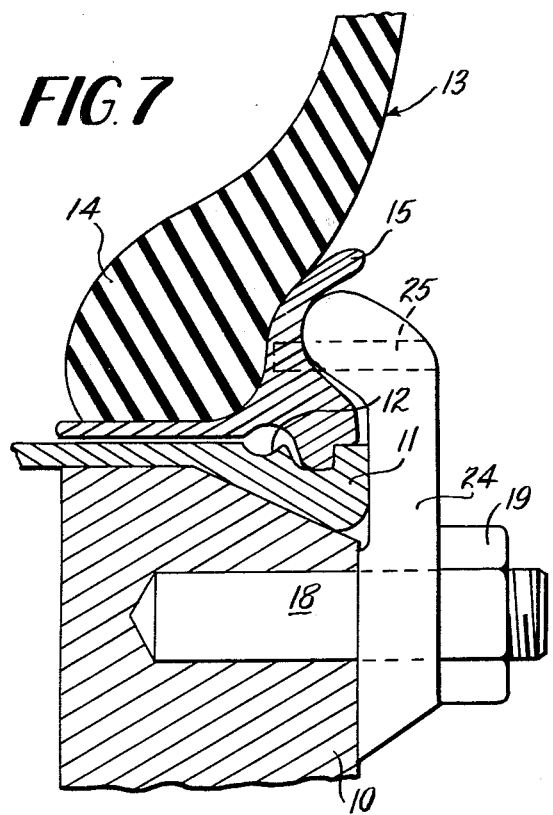
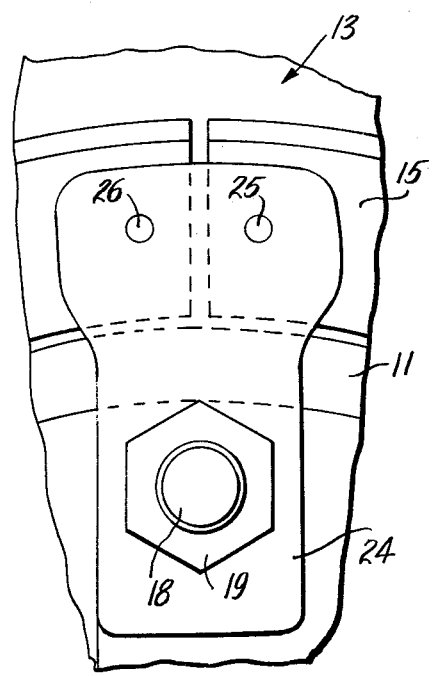

SAFETY MEANS FOR PREVENTING DEMOUNTING OF LOW OR FLAT TIRES FROM VEHICLE WHEELS

This application is a continuation-in-part of application Ser. No. 494,163 by John A. Diehl filed Aug. 2, 1974, now abandoned.

PRIOR ART

In recent years, due to improvements in power plants, suspensions and other parts of vehicles, vehicles capable of hauling substantial cargo weight have become capable of speeds unheard of less than 10 or 15 years ago. It is not unusual to see a fully loaded semi-trailer rig on an express highway maintaining a speed equal to or greater than the pace being set by ordinary passenger vehicles, which may be on the order of 60 or 70 miles per hour. (Now limited to 55 m.p.h.)

Obviously, these higher speeds and heavier loads have created a need for technical improvements in tires and wheels to sustain the punishment created by increased speeds and heavier loads. Much improvement has been made in this area, but tire failure, particularly tire failure on the front or steerable wheels of trucks, semi-trailer rigs and the like, remains at least one of the prime, if not the prime cause of truck accidents involving tremendous fatality rates among drivers and untold property damage, not only to the vehicles themselves, but to cargo, other vehicles and surrounding stationary property.

If the left front tire becomes deflated, the tractor, truck or bus will veer to the left and sometimes cross the median strip. It may jump the guard rail and run head-on into another vehicle going in the opposite direction.

The reason for this situation is that, almost inevitably, front tire collapse results in demounting of the tire from the wheel. This causes complete loss of control of the vehicle which has sustained the tire collapse.

Tire loss results because of the manner in which the tire is mounted on the rim which is not the same as a conventional auto tire. A conventional auto tire is relatively flexible and can be readily deformed by stretching the tire bead to slip over the bead holding flanges of a conventional auto wheel. Such auto-tire rims are often referred to as a drop-center rim because a central annular groove or wheel well is provided in the rim, into which the tire bead may be drawn as the final portion of the bead is distorted and drawn over the rim flange.

In contrast, a tube-type truck tire is generally mounted on a rim which consists of a cylindrical single-forged flange base on which the tire can be mounted without substantial distortion. The mounted tire is then secured in place by a side ring or a combination of side ring and lock ring suitably locked in an annular seat provided in the rim, whereby a second or outer flange is formed. The base may be a part of a wheel structure which includes a hub and five or six spokes, together with a disc wheel, or the base of the rim may be mounted on the spokes of the wheel and locked in place thereon by suitable lug means. Illustrations of typical truck-tire mounting arrangements may be found in a publication entitled "Wheel and Rim Operating Manual", Form W 1062R Revised September 1971, National Wheel and Rim Association, 4836 Victor Street, Jacksonville, Fla. 32207, in particular pages 10–17. Several simple illustrations are shown in the appended drawings as FIGS. 1, 2, 3 and 4 designated as "Prior Art".

As may be seen from these noted publications and as is well known in the industry, the side ring or lock ring mates with the base and is seated in the locking groove or rim gutter, primarily due to the fact that it is fabricated as a split ring having a resilience which tends to draw the ends into overlapped position as it assumes a relaxed condition because of, having a diameter smaller than the tire mounting base. The locking ring is thus pried into place on the base and by its resilient characteristics, snaps into the locking groove to retain the flange which locks the tire in place. If for any reason (such as an under-inflated tire) the locking ring is sprung out of its seat in the base or is not properly installed, the tire will demount from the base with the attendant disasterous results.

In fact, not only do moving accidents result if the locking ring comes loose, more than one tire-service man has been killed when rings, improperly installed, have broken loose when a tire is being inflated to the very usual but high tire pressures which range from 60 to 120 p.s.i. gage.

THE PRESENT INVENTION

Because of the deficiences prevelant in the prior art means of mounting tires and rim bases on hubs of spoked or disc wheels, the present invention has for its primary purpose the production of a locking means for preventing accidental demounting of a truck, tire or similar tire in the event of a tire failure or improper locking of the lock ring or outboard flange during installation.

Another objective of the invention is to provide a means for preventing accidental demounting of truck tires or the like which is adaptable to virtually every type of wheel, whether disc or spoke, and to the most common and conventional type of rim assembly, whether it be two-piece or three-piece, as will be described.

Other objects not specifically mentioned but inherent in the concept being disclosed will become apparent to those skilled in the art upon consideration of the following detailed description. Reference is made to the attached drawings.

BRIEF DESCRIPTION OF THE DRAWINGS

FIG. 5 is a fragmentary, vertical sectional view showing a section of a tire mounted on a spoked wheel on a three-piece rim construction, and showing the safety locking lug of the present invention.

FIG. 6 is a fragmentary side elevation of the device shown in FIG. 5.

FIG. 7 is a fragmentary vertical sectional view showing a section of a tire mounted on a spoked wheel on the two-piece rim construction and showing another form of the safety locking lug.

FIG. 8 is a fragmentary side elevation of the device shown in FIG. 7.

DETAILED DESCRIPTION OF CONSTRUCTION AND OPERATION

Figure 1:
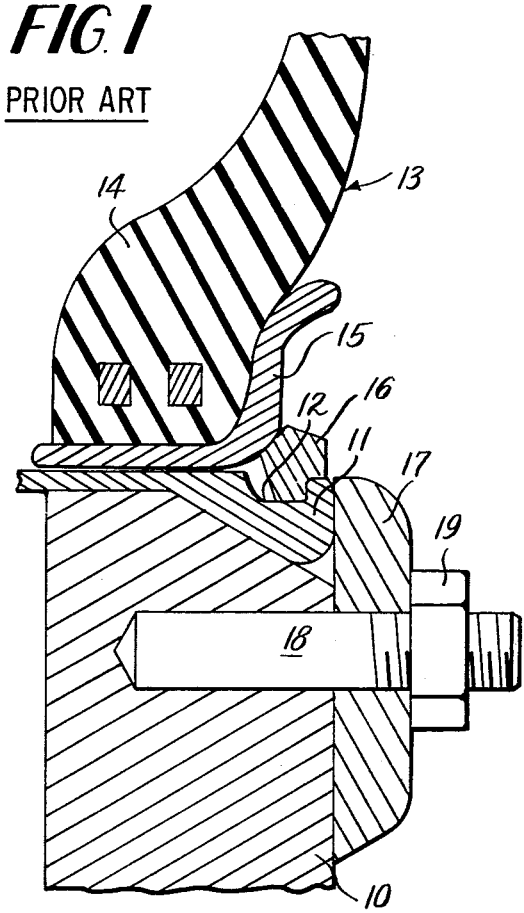
FIG. 1 is a fragmentary, vertical sectional view showing a section of a tire mounted on a spoked wheel embodying a typical three-piece rim construction of the prior art.
Figure 2:
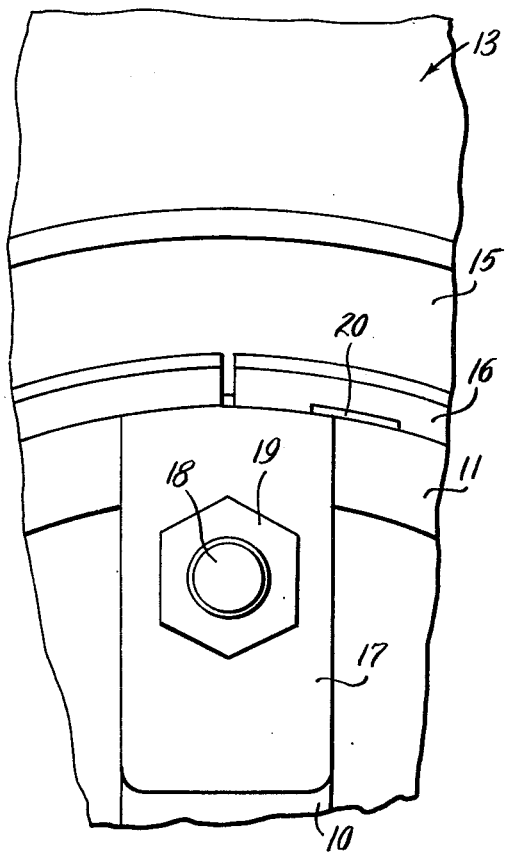
FIG. 2 is a fragmentary side elevation of the device shown in FIG. 1.

In FIGS. 1–4, of the accompanying drawings there are shown two forms of the rim constructions and locking lugs of the prior art. In FIGS. 1 and 2, the numeral 10 designates one spoke of a wheel, on the periphery of which is mounted a rim section 11 having a circumferentially-extending gutter 12 around the outer top surface thereof. The tire 13 has its outer bead portion 14 mounted on an outer flange 15 which rests on rim section 11. A circumferentially-extending, radially split locking ring 16 is disposed circumferentially within the gutter 12, the diameter of the locking ring being slightly greater than the diameter of the outer edge of rim section 11 whereby the inner surface of the locking ring 16 abuts against the outer flange 15. As is the usual practice, the tire and the rim sections and the locking ring are retained on the wheel by means of a locking lug 17. One such locking lug 17 is mounted on each of the spokes of the wheel 10 by means of a bolt 18 and a lug nut 19. The upper edge of locking lug 17, as viewed in FIGS. 1 and 2, terminates in line with the top of the outer surface of rim section 11. As shown in FIG. 2, locking ring 16 is provided with a circumferentially-extending relatively short recess 20, into which a screw driver or similar tool may be inserted to pry said locking ring 16 out of gutter 12 of rim section 11.

Figure 3:
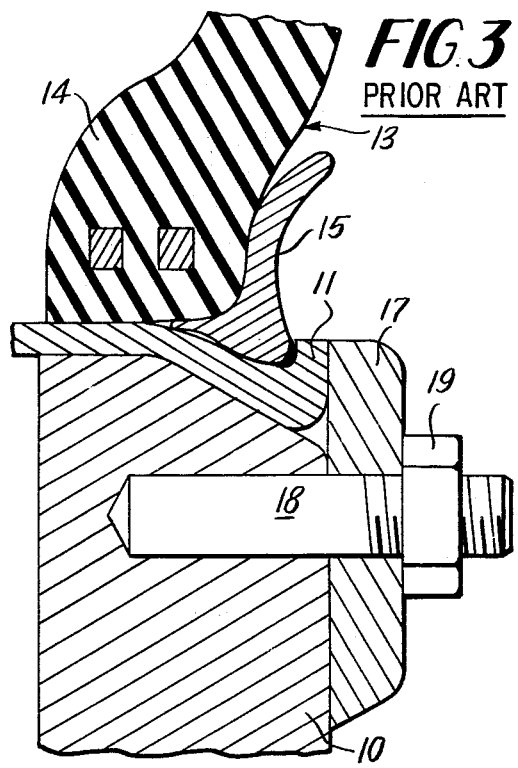
FIG. 3 is a fragmentary, vertical sectional view showing a section of a tire mounted on a spoked wheel embodying a typical two-piece rim construction of the prior art.
Figure 4:
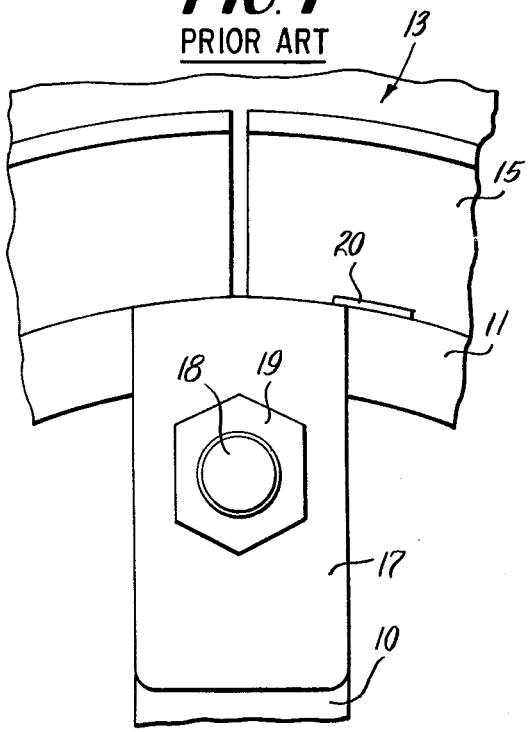
FIG. 4 is a fragmentary side elevation of the device shown in FIG. 3.

FIGS. 3 and 4 show the usual form of two-piece rim construction and the locking lugs 17. The showing of these two figures corresponds to the showing of FIGS. 1 and 2 except in the form of rim constructions. That is, in the two-piece rim construction, no circumferentially-extending locking ring such as ring 16 is included. Instead, the rim section 15 serves as a locking rim as well as a rim section or rim flange. The rim section 15 is engaged behind the upturned edge 14 of rim base 11. As clearly shown in FIGS. 3 and 4, the top of the locking lug 17, as viewed in FIGS. 3 and 4, terminates in line with the top of the outer surface of rim section 11.

As is quite apparent from consideration of FIGS. 1–4 inclusive, the lugs 17 in either case serve only to keep the respective bases 11 mounted on the spokes 10 of the wheel hub. Thus the locking rings 15 and 16 respectively are held in the respective locking grooves formed in base 11 by the characteristics of the material of which the rings are fabricated, and by the inwardly directed forces created against the rim sections by the bead of the tire 13 when it is inflated. These inwardly directed forces press the rim sections either against locking ring 16 (FIG. 1) or press the rim section itself into the cooperating locking lip 14 as shown in FIGS. 3 and 4. The effect of these forces is quite considerable because of the high inflation pressures used in truck tires, on the order of 60–120 psi gage. Thus when a tire becomes deflated or its pressure is reduced, a substantial decrease in the lateral force needed to keep the rim and/or locking ring in place is realized. Coupled wih this reduction in seating force there is the adverse loading introduced against the rim, tending to roll it off the base as the bead of tire 13 tends to break loose either from the rim base or the rim section due to the forces tending to rotate the bead in a clockwide direction as the tire deflates. Under these circumstances, since the lug 17 bears against only the rim 11, the locking rim 16 or the outer flange 15 are not prevented by lug 17 from rolling out of the locking grooves when the tire deflates. Obviously, if locking rim 16 or flange 15 rolls out, the tire can leave the rim, causing loss of control.

In FIGS. 5 and 6 is disclosed one embodiment of the invention. As shown in FIGS. 5 and 6, the lug 24 is used to lock the rim 11 on the spokes 10, as is conventional. However, the lug is provided with an extension in the form of an inwardlyturned protuberance which overlies the locking ring 21 and bears against the tire engaging flange 15. The protuberance is provided with an interior recess 30 which overlies a pair of projections 22 and 23 provided on the adjacent ends of locking ring 21 at the split point. Thus the lug not only retains the locking rim against lateral motion as viewed in FIG. 5 but, because of the locking ring projections 22 and 23 with the recess provided in lug 24, the locking rim cannot expand diametrically. Hence, it is impossible for the locking ring to become unseated from locking groove 12. It should be further noted that were the lugs 22 and 23 and the recess 30 omitted, there would still be a restraint imposed on both the flange and locking ring, which are still constrained against both circumferential, radial and axial movement because the terminal end portion of the lug overlies the locking ring 21 and also overlies the innermost edge portion of rim flange 15 adjacent the locking ring 21. Of course, the absence of lugs 22 and 23 and recess 30 materially reduce the resistance of the assembly from dislodgement though, certainly there is definitely increased safety factor over the prior art structures as illustrated in FIGS. 1–4 inclusive.

FIGS. 7 and 8 disclose a two-piece rim construction in which circumferentially-spaced holes are provided adjacent the terminal abutting ends of the outer flange member 15. A pair of pins 25 and 26 are mounted in circumferentially-spaced relation corresponding to the location of the spaced holes in the outer flange 15. Pins 25 and 26 extend inwardly a sufficient distance beyond the inner surface of said locking lug 24 to enter the said spaced holes. The arrangement is such that when the inwardly-extending ends of pins 25 are received within the holes and the locking lug 24 is tightened by the bolt and nut device 18 and 19, the outer flange 15 is prevented from circumferential, radial or axial movement in the event of tire deflation.

Figure 9:
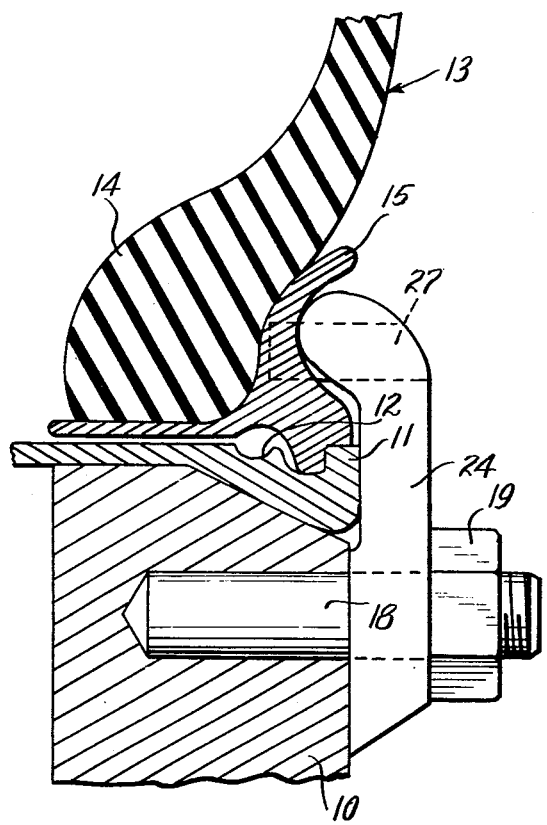
FIG. 9 is a fragmentary vertical sectional view showing a section of a tire mounted on a two-piece rim construction and showing another form of safety locking lug of the present invention.
Figure 10:
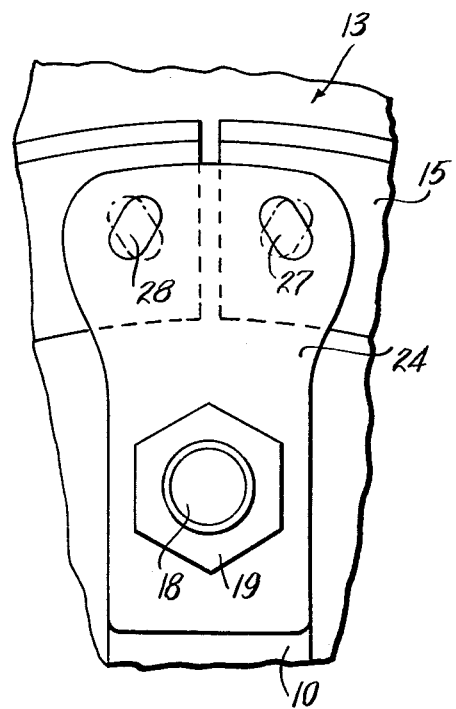
FIG. 10 is a fragmentary side elevational view of the device shown in FIG. 9.

FIGS. 9 and 10 are quite similar in their showings to the showings of FIGS. 7 and 8, respectively. In FIGS. 9 and 10, oval-shaped holes are provided adjacent the terminal abutting ends of the outer flange member 15 and are disposed at an angle, as clearly shown in FIG. 10 of the accompanying drawings. Obviously, the openings could be arranged with either bottom or top edges diverging, as indicated respectively by the solid-line and dotted-line outlines, also shown in FIG. 10. A pair of pins 27 and 28 are mounted on the locking lug 24 in circumferentially-spaced relation corresponding to the location and configuration of the spaced holes in the outer flange 15. The pins 27 and 28 extend inwardly a sufficient distance beyond the inner surface of the locking lug 24 to enter the spaced holes in side flange 15. The arrangement is such that when the inwardly-extending ends of pins 27 and 28 are received within the holes and the locking lug 24 is tightened by the bolt and nut devices 18 an 19, the outer flange 15 is prevented from circumferential, radial or axial movement.

Figure 11:
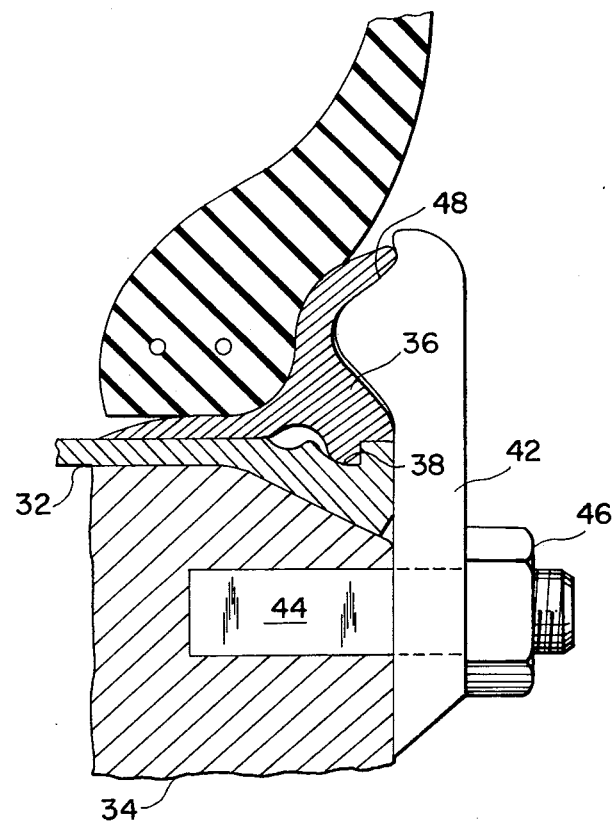
FIG. 11 is a sectional view of a so-called two-piece rim assembly including a further form of the disclosed invention.
Figure 12:
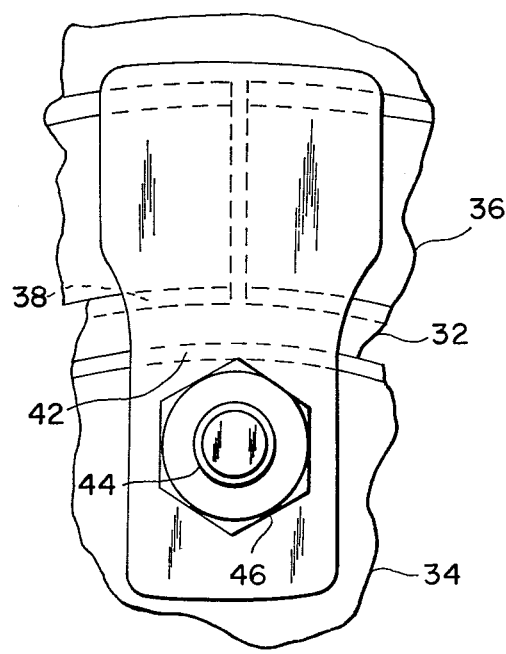
FIG. 12 is a fragmented elevational, side view of the device shown in FIG. 11.

In FIGS. 11 and 12, another form of safety device is illustrated as applied to a two-piece rim assembly. In this form, the rim base 32 mounted on spoke 34 receives the combined rim flange and locking rim 36 in a circumferential groove or gutter 38. As shown, the outer face of the flange 36 is trough-shaped as clearly shown in FIG. 11. The locking lug 42 is placed on a conventional bolt 44 and fastened thereon by a conventional lug nut 46.

As clearly shown in FIG. 11, the upper inner surface of the lug is provided with a bulbous projection 48 which has a shape compatible with the shape of the flange trough so that the projection overlies the lower edge of the flange 36. Obviously, when lug nut 46 is tightened, the projection will prevent circumferential, radial and axial movement of the flange should there be a tire failure. Obviously, too, the flange must be properly installed in gutter 38 or the lug 42 will not draw up properly. Hence, one installing the tire should know that the inflation thereof could result in accidental dislodgement of the flange with the attendant chance of physical harm.

Figure 13:
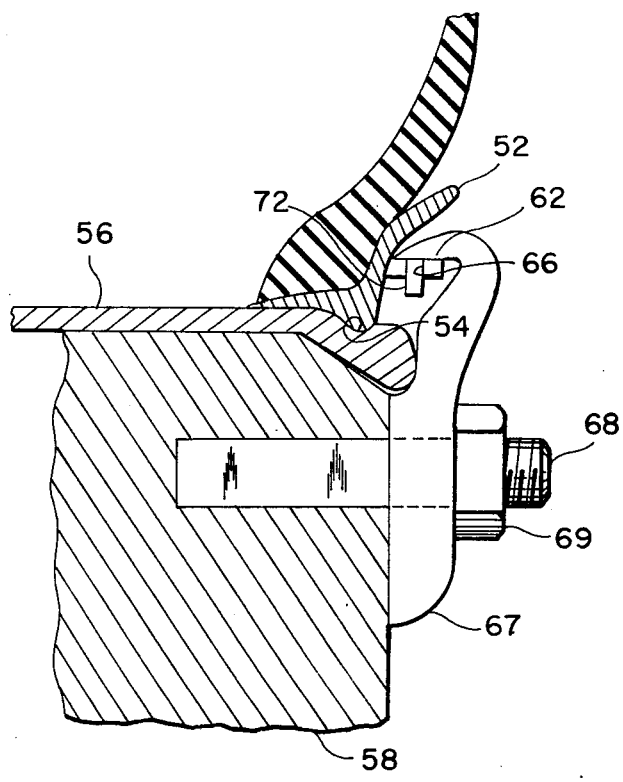
FIG. 13 is a view similar to FIG. 11 but showing a further modification of the safety device.
Figure 14:
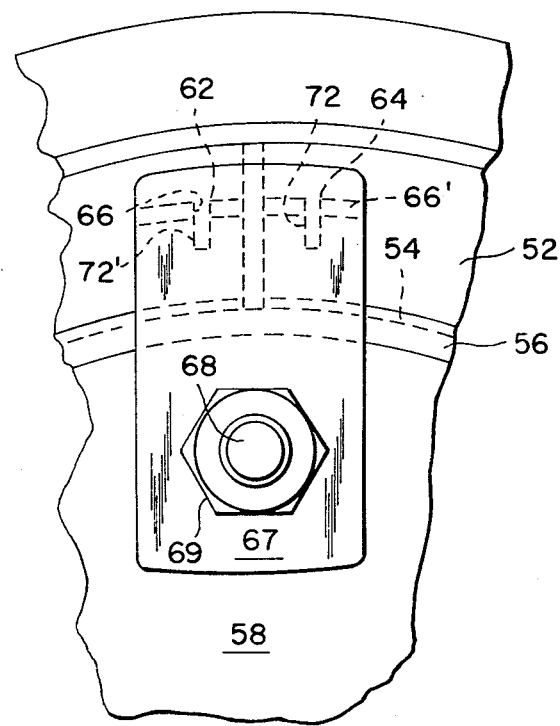
FIG. 14 is a fragmented elevational view of the device shown in FIG. 13.

In FIGS. 13 and 14, a further modification is disclosed, which modification has utility with either two-piece or three-piece rims mounted on spoke wheels. In this embodiment, the flange 52 is locked in a groove or gutter 54 which is provided in rim base 56, which, in turn is mounted on spoke 58. Projecting out from flange 52 are a pair of cooperating tabs 62 and 64. These tabs may be welded to the flange and the stress relieved after welding. Each tab is provided with an aperture 66 or 66'.

The assembly is held in place on spoke 58 by lugs 67, which are mounted on conventional lug bolts 68 by lug nut 69.

As shown clearly in FIG. 13, the upper end of lug 67 has a shape quite similar to that of a button hook with depending pins 72, 72" and extending vertically downwardly toward the rim base. Each of the pins 72 or 72' is inserted through a corresponding aperture 66 or 66'. When the lug nut is tightened, the flange cannot move circumferentially, radially or axially regardless of the condition of the tire.

Where each spoke of the wheel is provided with this safety device, those tabs which are attached to the flange at other than the split ends may be single-piece tabs having two apertures to receive the pins 72 or 72' on lug 67.

Figure 15:
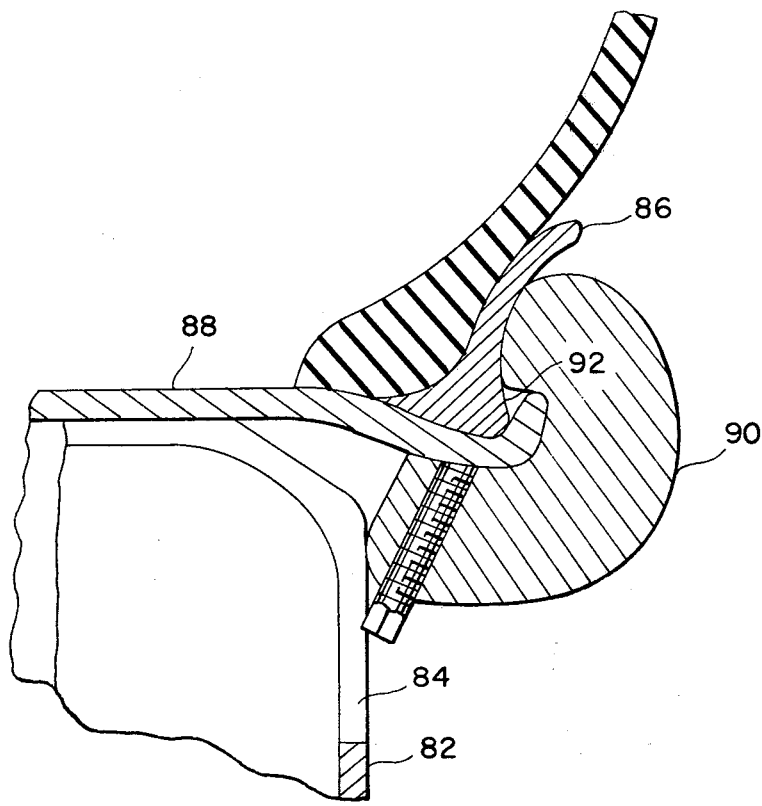
FIG. 15 is a fragmented, elevational sectional view showing a further configuration of safety device particularly adapted for use with a disc wheel as distinguished from a spoked wheel. and finally.
Figure 16:
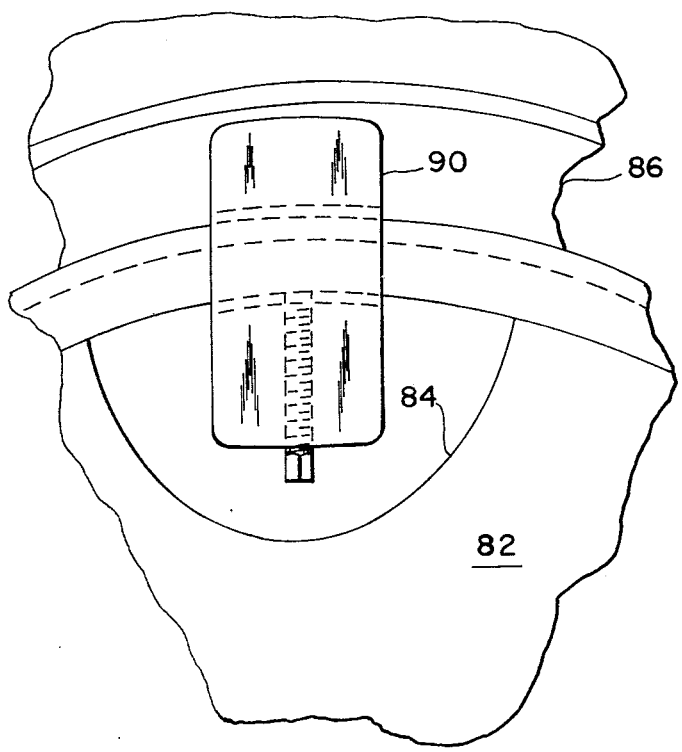
FIG. 16 is an elevational view of the structure disclosed in FIG. 15.

Lastly, FIGS. 15 and 16 disclose another form of safety device adaptable for use on disc-type as distinguished from spoke-type wheels. As is well known, disc-type wheels are conventionally mounted on the wheel hub of a vehicle by lug nuts or bolts adjacent the center of the disc. The central disc which supports the rim assembly is usually bowl shaped and is provided at spaced circumferential locations adjacent the rim with access and/or cooling openings of generally hemispherical configuration opening toward the rim assembly. In FIG. 16, there is shown a fragmented portion of such a wheel comprised of a dished disc 82 provided with a hemispherical aperture 84. While it is adapted for use on either two-piece or three-piece rim assemblies, this form is shown as applied to a two-piece assembly merely for drawing convenience.

As is usual, the flange 86 serves as both rim flange and locking ring for holding the tire on rim base 88. The safety device 90 is of general C-clamp configuration having one end configured so as to overlie the upturned end of the rim base 88 and also to overlie the lower edge 92 of the flange as clearly shown in FIG. 15. A set screw 94 is provided in the opposite end of the C-shaped device and is threaded therein at such an angle that, as it is tightened, it engages the underside of the rim base and clamps the device in place over the locking ring or base of the outboard flange. The size of the C-shaped member is such that it easily fits in the space provided by access or ventilation hole 84.

It will be apparent that various modifications and changes will occur to those skilled in the art, which changes and modifications fall with the spirit and scope of the appended claims.

What is claimed is:

1. In a two-piece rim system for receiving and retaining a tire for a wheel of a motor vehicle, the tire including an outer bead portion, the system comprising:
   A. a bowl-shaped disc-type body portion provided, at spaced circumferential locations, with openings adjacent to a rim thereof,
   B. a rim base affixed to the rim of the body portion and including a circumferentially-extending upturned outer edge, and
   C. a circumferentially-extending outer flange resting on the top surface of the rim base and engaged inside the upturned outer edge, the outer flange having an inner surface engaging the outer bead portion of the tire, The improvement comprising:
   D. a C-shaped clamp comprising a central portion and first and second end portions turned toward an inner side of the central portion, the clamp being positioned in the openings of the body portion, the inner side of the central portion being positioned over said outer edge of the rim base, the first end portion of the clamp forming a protuberance bearing against an outer surface of the tire-engaging outer flange, the second end portion of the clamp having an inner side of conforming shape to fit adjacently to the outer bottom surface of the rim base, and
   E. a set screw threaded in the second end portion of the clamp and engaging the outer bottom surface of the rim base,
      whereby the clamp is fixed in place to the rim base to prevent the outer flange and the tire from becoming detached from the rim if the tire is deflated.

* * * * *